United States Patent [19]

Starr

[11] 4,240,648
[45] Dec. 23, 1980

[54] SAFETY GUARD FOR WORK PLATFORMS
[75] Inventor: Darrel N. Starr, Yorkville, Ill.
[73] Assignee: Caterpillar Tractor Co., Peoria, Ill.
[21] Appl. No.: 814,597
[22] Filed: Jul. 11, 1977
[51] Int. Cl.³ ............................................. B60R 21/00
[52] U.S. Cl. ................................... 280/760; 296/190; 296/35.2; 180/89,12
[58] Field of Search ............... 296/1 R, 28 C, 35, 102, 296/190, 35.2; 280/760; D25/73; 180/89.12

[56] References Cited
U.S. PATENT DOCUMENTS 3,690,720  9/1972  Whisler .............................. 296/28 C
3,981,521  9/1976  See ...................................... 280/760

Primary Examiner—Richard A. Bertsch
Attorney, Agent, or Firm—Sixbey, Leedom & Freidman

[57] ABSTRACT

A safety guard for work platforms, such as on a wheeled earth working vehicle, wherein the guard comprises a handrail assembly mounted on the platform, with mounting portions of the assembly being formed with a reinforcing member in the area of normal greatest strain, providing structural integrity, and with mounting attachment means being confined within the peripheral outline of the platform, and therebelow, and hidden from view.

24 Claims, 7 Drawing Figures

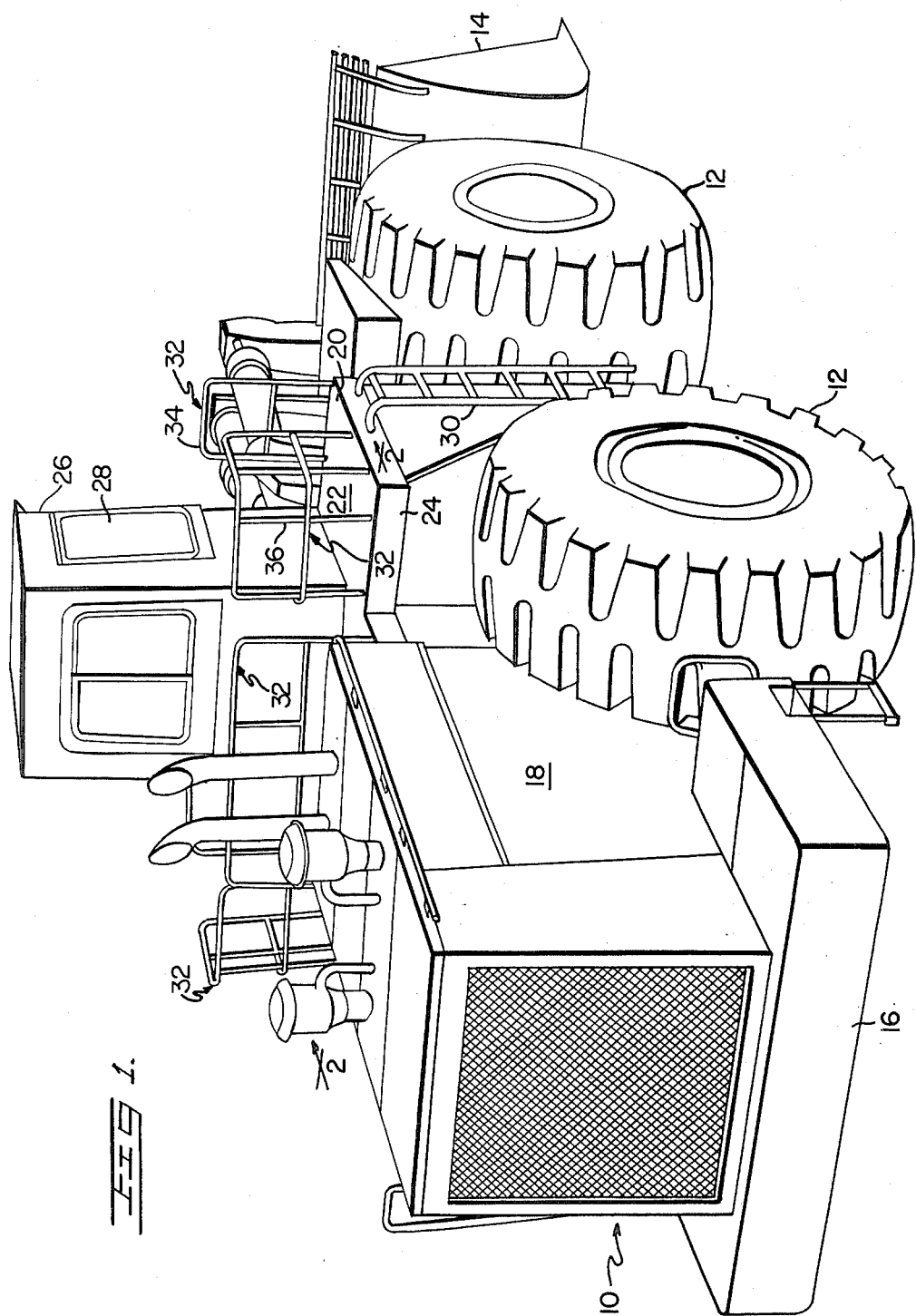

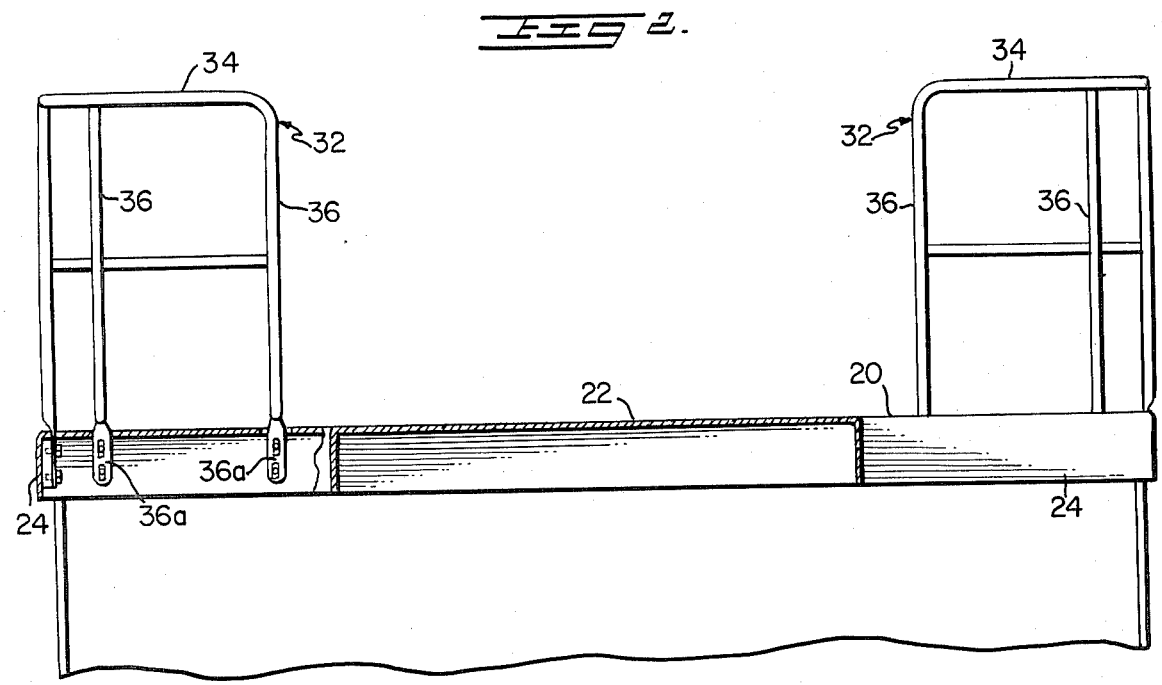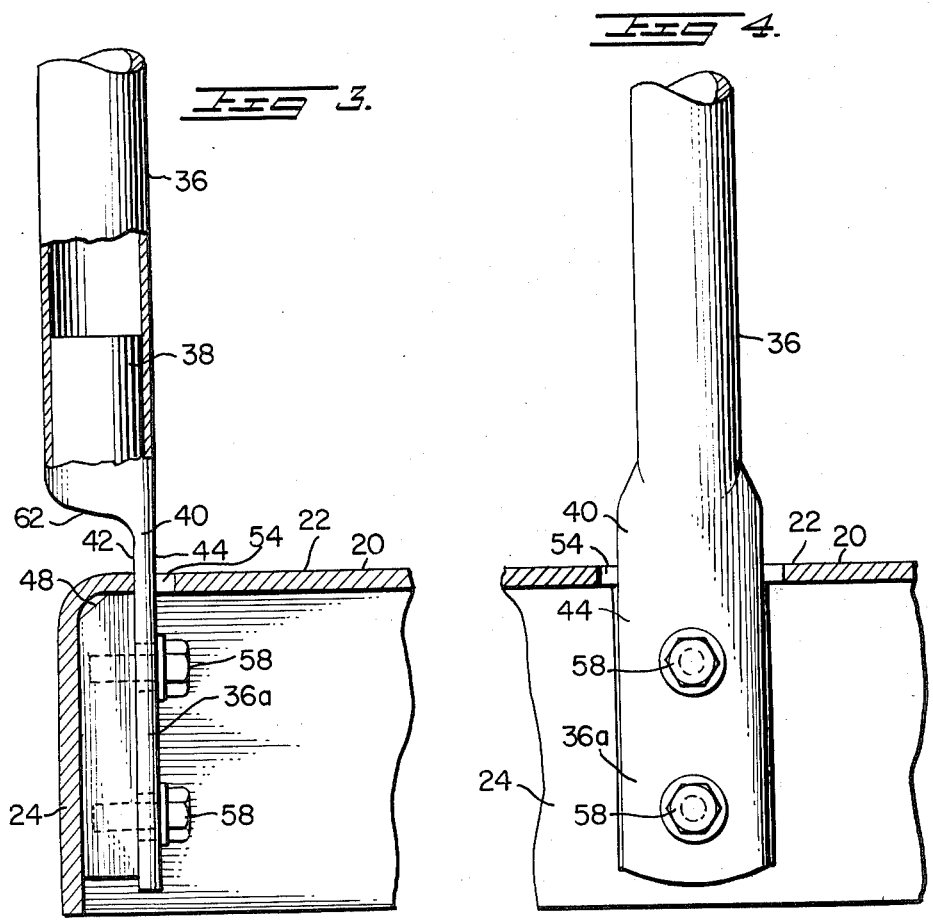

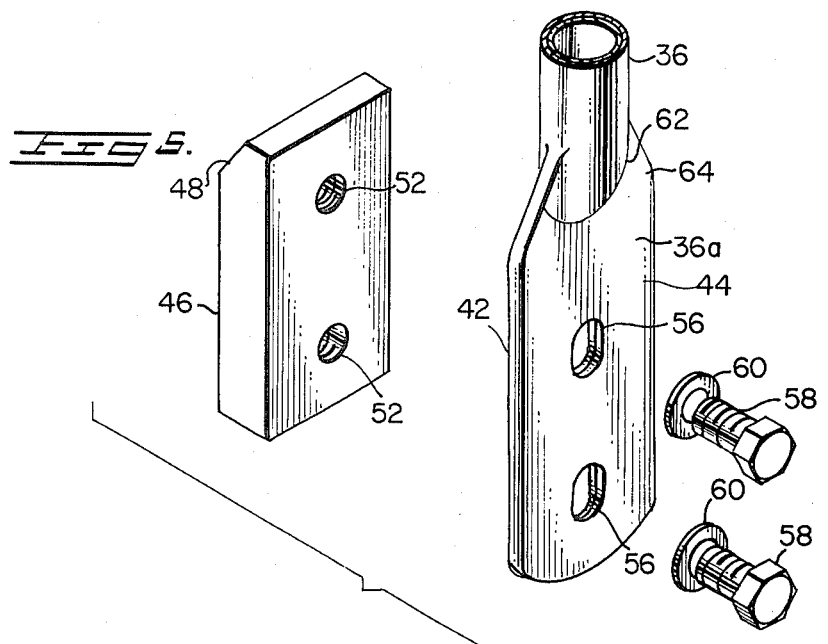
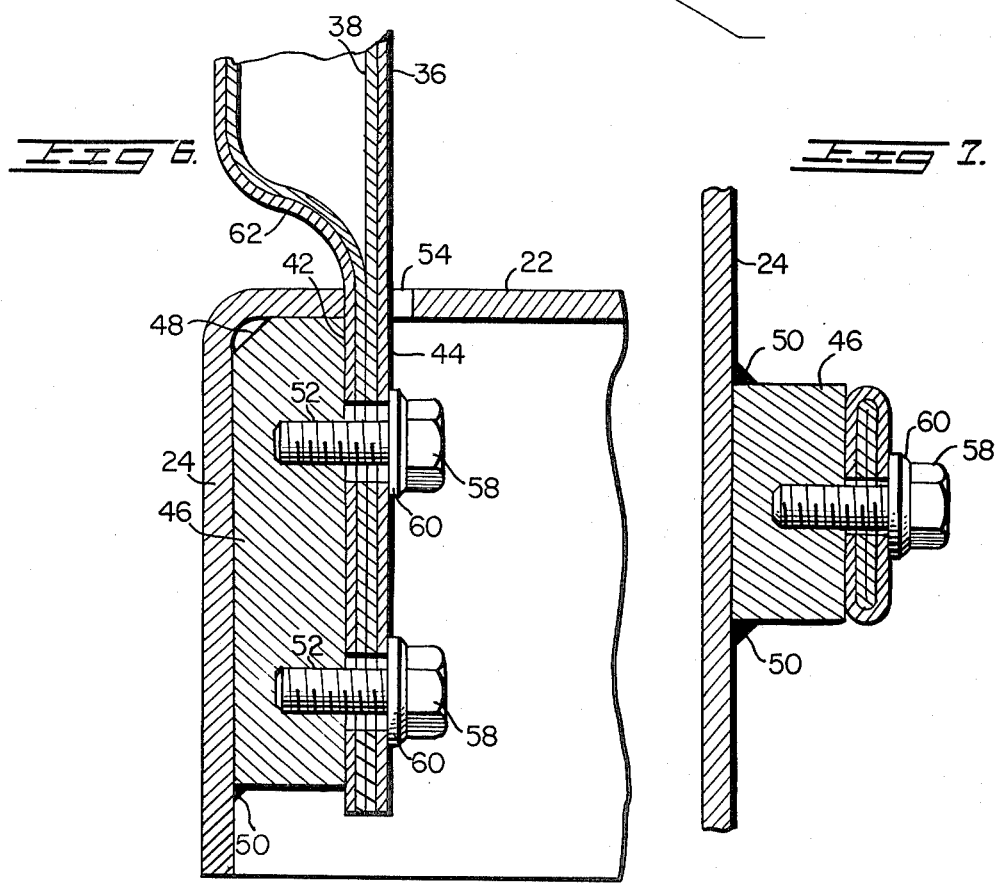

SAFETY GUARD FOR WORK PLATFORMS

BACKGROUND OF THE INVENTION

This invention relates broadly to protective guards, in the nature of handrail assemblies, which are of such a construction and so mountable as to extend above a work surface such as a work platform, and adapted for personnel use, the structure being rigidly attached to the platform and in accordance with the present invention on the underside thereof, so as to eliminate protuberances extended outside of the peripheral structural outline of the platform, and with mounting attachment means being hidden from view.

This invention more specifically relates to vehicles adapted for use in construction work, earth moving, and like fields, including but not limited to wheeled front end loaders. Such vehicles usually incorporate an operators cab mounted on a platform which is usable by the operator, or other personnel, during normal operation of the vehicle, and also providing access to various areas or components of the vehicle. Ladders usually operatively extend from in proximity to the ground to the platform for access thereto, the platforms in many constructions being elevated a substantial distance above a surface.

The nature of work, the working environment of such vehicles, and indeed the construction of such a vehicle itself, frequently impose hazardous working conditions on personnel. It is highly desireable that safety precautions be taken to minimize possible injury to such personnel.

Difficulties are also encountered where such machines have a construction tending to have deleterious contacts with external objects and environment. A construction minimizing these drawbacks is also highly desirable.

DESCRIPTION OF THE PRIOR ART

One safety item or feature which has been heretofore used, is to incorporate handrails in those areas of a platform normally used by working personnel, and preferably handrail assemblies are superposed on the platform, and extend around the periphery thereof in a manner such that at least segments are readily available to personnel on the platform. While such handrails, generally speaking, are a valuable safety asset, there have been features in many constructions which detract from optimum performance. These have included, for example, structural weakness, lack of structural integrity, structural weakness as equated to costs, external protrusions or protuberances of a nature such that they detract from structurally clean external outlines of the machine, and which can result in dangerous contacts such as striking and snagging personnel or objects in the work area, with possible resultant injuries. It is also desirable that equipment of the nature involved be esthetically clean and visually attractive, contrary to many previous constructions.

Some known constructions have included, for example, metal structural members such as bars or angle irons of substantial mass which are expensive, entail complicated production, are difficult to mount, have inherent weaknesses at the place of attachment or other areas of considerable strains in use, and which by their very nature present portions extending externally from the units which are capable of inflicting serious damage to personnel, equipment and the surrounding medium.

SUMMARY OF THE INVENTION

The present invention accordingly is directed basically to providing safety and convenience means for a working surface with structural features and characteristics which overcome drawbacks and deficiencies in prior known types, and which present, for the first time in equipment of the type involved, a greatly improved safety concept embodying very substantial improvements from the standpoint of personnel safety, equipment safety, environmental safety, esthetic appearance, simplicity, inexpensiveness and structural integrity.

The structural features, characteristics and advantages of the present invention are particularly applicable to vehicles in the nature of construction, earth moving, grading and the like machines, and even more so as applied to, for example, a wheeled front end loader. Such a front end loader normally includes a wheeled body having superimposed thereon, in addition to driving means and a bucket or the like, an operator's cab which is superposedly mounted above an operator's platform. The various controls for operation of the front end loader are contained within the cab and under normal circumstances the operator can control operation of the loader from within the cab. Such an operator platform, and the cab thereon, are usually elevated a substantial distance from the surface on which the vehicle is moving, and a ladder is normally provided so that the operator can ascend to the platform and the cab.

Under some circumstances of use, there may be additional personnel on the platform, or for matters such as servicing some components of the machine it is necessary that an operator or other personnel be able to move around on the operator's platform. Under such circumstances it is highly desirable that protective devices be utilized to prevent the operator or other personnel from falling from the platform or, in some instances, from coming in engagement with working mechanism with obvious possibilities of serious injury.

The safety features of significance in the present invention reside in the provision of a handrail assembly mounted on the operator's platform in such a manner, and of such a construction, as to provide for ultimate or optimum safety and at the same time providing additional highly desirable characteristics.

To this end, the handrail consists of frameworks of tubing adapted for vertical mounting from and above the operator's platform, and the structure and mounting means being such as to provide structural integrity, strength per se, and pleasing installation. The strength is provided by utilizing a double tube construction, i.e., lower ends of the tubes are doubled or arranged one within the other, the OD of the inner tube being slightly less than the ID of the outer tube. This double tube construction extends over several inches from the bottom and a portion of the double tube construction, starting from the base end, are so mashed as to define a flattened end portion, the inner tube constituting a reinforcing member for the outer tube. The operator's platform has a slot extending therethrough and the flattened ends of the tubes are inserted through the slots, and securement of the rails are effected by means of securing bolts below the operator's platform and contained within the peripheral outlines thereof. The attachments are thus hidden from view when the handrail is positioned on a machine, and at the same time the arrangement eliminates portions which extend beyond or externally of the machine and/or operator's platform.

In the end construction, the handrails are of a size sufficient to provide protective means over substantially the entire desired area of the operator's platform, and the lower ends of vertical members forming the mounting means for the handrails, which additionally have interconnecting horizontal portions, are each and every one secured in the foregoing manner.

This construction and method of attachment provides, in part, a structure wherein the attachment is confined or contained within the body, eliminates external protuberances, thereby minimizing possible snagging or catching of personnel or external objects in the area, thereby being safer to operating personnel, to personnel in the area, and safer operating as regards external objects.

The structure has inherent strength due to the doubled or reinforced end construction and this is further increased by having a block welded to the interior skirt of the platform, as also to the undersurface of the platform, the welding to two surfaces providing strength and structural integrity.

The present structure, while giving improved results, is basically inexpensive as regards initial materials, forming equipment, labor and mounting. A minimum structural change to the vehicles is necessary and, as will appear hereinafter, the mounting provides for adjustability.

Additional objects, features and advantages of the invention will be more readily apparent from the following detailed description of an embodiment thereof when taken together with the accompanying drawings in which:

FIG. 1 is a rear perspective view of a front end loader incorporating the invention;

FIG. 2 is a fragmentary sectional view taken on line 2—2 of FIG. 1;

FIG. 3 is a fragmentary view, partly in section, showing the lower end of a vertical leg of a handrail assembly in accordance with the invention, as mounted and connected to an operator's platform;

FIG. 4 is a view taken at right angles to FIG. 3 and showing the rear view of the mounting connection;

FIG. 5 is an exploded perspective view of that portion of the mounting and connecting means shown in FIGS. 3 and 4;

FIG. 6 is an enlarged fragmentary view similar to FIG. 3 but showing in greater detail various components of the structure and mounting means therefor; and FIG. 7 is an enlarged fragmentary sectional view of the attachment structure.

DETAILED DESCRIPTION

Referring now in detail to the drawings, there is shown in FIG. 1, and generally designated 10, a front end loader having the usual wheels and tires 12 operatively supporting the same, and a bucket 14, all of which are of a known construction. Also as usual, the machine includes a base frame, not shown, to which are mounted a rear bumper 16, and an engine hood indicated at 18 within which a drive engine and components thereof are contained.

Additionally, the vehicle includes an operator's platform 20 which has a substantially flat top 22 derived from a sheet of flat steel material or the like, and of sufficient thickness and composition to provide the necessary strength characteristics. The operator's platform additionally has a downwardly depending skirt or flange 24 extending around a substantial portion of the periphery of the operator's platform. The configuration of the operator's platform is devised to appropriately apply to a particular machine, and to mount or contain the necessary elements for control and operation of the device. An operator's cab 26 is of a usual type, having a plurality of windows 28, and internally of which are the usual controls, levers and operator's seat, etc., not shown. A ladder 30 is provided and which extends into proximity to the surface on which the vehicle is operating, the other end of which is attached in any desired manner to the operator's platform so as to permit personnel to attain the operator's platform. In many machines, the operator's platform is elevated a substantial distance above the surface, and this feature plays a substantial part in the present invention.

As is well known and understood, movement around the operator's platform is required, initially for the operator to get from the ground to the platform, and then into the operator's cab. Under some circumstances, movement of an operator or other personnel from one area or position on the operator's platform to another is necessary or desired. Under some operating conditions such movement may be is desired, and certainly when various parts of the apparatus must be serviced which are accessible from different positions or areas of the operator's platform. There is always the inherent danger of a person falling off the platform, particularly during movement of the device or when bending over, etc. in servicing portions or components of the vehicle. It is essential, therefore, to provide a safety feature in the nature of guards. These guards are generally indicated at 32 and, as shown, are so placed and related around the outer periphery of the platform as to provide substantially complete coverage for personnel by way of handrail assemblies 34, which are mounted to and extend vertically above the operator's platform. The particular construction and mounting of these handrail assemblies is of the essence of the invention, and will be described in greater detail with reference to FIGS. 2–7 inclusive.

As will be seen from these figures, the guards 32, which generally include handrails having horizontal portions 34, have vertical legs 36 connected at their upper ends to the handrail horizontal portions 34. The vertical legs 36 are adapted for mounting of the overall guards or handrails on the operator's platform. Attention is directed now particularly to FIGS. 3, 5 and 6 for the construction of the mounting or attachment means. Each of the vertical legs 36 consist of tubing of a known type and which can be of different materials also well known in the art. Within the lower extremity or end of the tubing 36, there is an interior or strengthening tube 38, and which consists of basically the same structure and material as the tube 36 but which has an OD of slightly smaller dimensions than the ID of the external tube 36. This strengthening tube 38 covers the lower few inches of the composite construction, and subsequent to being positioned therein, the lower end of the composite tube is flattened from one side to the other to provide a flattened area or portion 40. The structure in actuality includes a flat inner face 42 and an outer surface 44. The flattening of the double or composite tube is in essence a pinching function.

The top 22 of the operator's platform in effect constitutes a horizontal web of the platform, and the depending skirt 24 constitutes a vertical web. A metal block 46, FIG. 6, is positioned within the enclosed space formed by the operator's platform, i.e., as formed by the juncture and extension of the horizontal and vertical portions thereof. As will be seen, the block is chamferred at 48 to permit intimate contact and a press fit between the block and the inner surfaces of the platform. The block is welded, as generally indicated at 50, and is accordingly rigidified and attached to the underside or interior of the operator's platform. This block, accordingly, as so positioned and attached, has enhanced structural integrity with respect to the overall construction, by being fastened to both the horizontal and vertical portions of the platform. The inner side of the block is provided with threaded bores or openings, FIG. 5, at 52.

As seen in FIGS. 3, 4 and 6, the flat deck or flat surface 22 of the operator's platform has slots therethrough, indicated at 54, and in mounting the handrails the flattened lower ends of the vertical members 36 are passed through the slots 54. These lower flattened ends are provided with elongated rectilinear openings 56, with round ends conforming to the size and shape of bolts 58 adapted for passing therethrough, coacting with washers 60 or the like, and being threadedly engaged in the openings or bores 52 in the block. The elongated openings 56 permit vertical adjustment of the vertical members 36 of the handrails. The vertical spacing of the two attachment bolts and cooperating openings 56 and 52 insure a tight and wobble free mounting of the handrails.

The intercoaction of these various parts in the assembly is readily apparent from FIG. 7.

Referring to FIG. 5, the lower end of a vertical leg 36 is indicated at 36a, and it will be noted that the juncture or joining area, or region, or line at 62, and the winged portion 64, insure the integrity of the two tubes and lock the same together.

It will, accordingly, be seen that the guards consisting primarily of the handrail assemblies are so mounted as to have the mounting means or mounting bolts hidden from view beneath the operator's platform. Further, in this handrail assembly means are provided whereby the mounting portions of the assembly are formed with a reinforcing member, the inner tube, and a block is so mounted and attached to the flattened lower end of the vertical member 36, as to provide structural integrity. Great strength is provided in the critical area i.e., substantially at the line of mating between the lower end of the vertical member and the upper surface or portion of the operator's platform indicated at 20. Since there are no external protuberances, the safety features as herein delineated are obtained. Aesthetically, as well as structurally, the present invention provides an enhanced structure. The adjustability and ease of assembly are of substantial significance, as is the inexpensive material used, and the minimum work required for forming and mounting. Sections can be distributed as desired, and including corner rounding portions.

While a preferred embodiment has been shown and hereinabove described, it is manifest that minor changes or modifications in the structure can be effected without departing from the spirit and scope of the invention as defined in, and limited solely by, the appended claims.

I claim:

1. A guard and protective handrail assembly adapted for mounting on a work platform to afford protection and convenience to persons while on said platform, said handrail assembly including a framework with at least one side member having a base end attachable to the platform, said side member extending vertically upwardly from said platform, said platform including a substantially flat top and a depending peripheral skirt, said top having a slot therethrough disposed inward of said skirt, said side member being a tube having said base end thereof flattened, inserted in, and extended through said slot, and means fixedly attaching said flattened extended end to the underside of said platform and interiorly of the peripheral skirt, the attachment to the platform being disposed within the confines of the external perimeter of the platform and thereby preventing contact with objects external to the platform, or with a person on the work platform.

2. A handrail assembly as claimed in claim 1, said work platform being mounted on a vehicle and constituting an operator work platform thereon, said work platform providing access to vehicle drive and operating mechanisms for the operator and other personnel.

3. A handrail assembly adapted for mounting on a work platform to afford protection and convenience to persons while on said platform, said handrail assembly including a framework with at least one side member having a base end attachable to the platform, and the side member extending vertically upwardly therefrom, said platform including a substantially flat top and a depending peripheral skirt, said top having a slot therethrough, said side member being a tube having said base end thereof flattened, inserted in, and extended through said slot, a block affixed to the underside of said platform and secured to the inner surface of said top and said depending skirt at the juncture point thereof, said block having threaded bores therein, said flattened extended end of said side member having openings therethrough, and securing bolts extending through said openings and operatively threadedly engaging in said threaded bores in said block for attachment of the side member thereto and to said platform.

4. A handrail assembly as claimed in claim 3, wherein said block has a chamferred corner edge positioned in the angle formed between the inner sides of said top and said depending skirt whereby the surfaces of said block are intimately engaged with the surfaces of the platform, with the block being welded to said surfaces, and overall providing structural integrity to this portion of the mounting attachment means, with the attachment means being wholly confined within the space formed beneath the top and peripherally defined by the depending skirt.

5. A handrail assembly as claimed in claim 4, wherein said block has vertically spaced internally threaded bores therein, and said flattened extended end has vertically spaced openings therethrough, whereby said end, and consequently the handrail assembly, are securely attached to said block by bolts operatively interconnecting the members.

6. A handrail assembly as claimed in claim 5, said vertically spaced openings through said flattened extended end being of elongated slot like configuration having rounded ends of a shape and size commensurate said bolts extendable therethrough, said elongated slots permitting vertical adjustment of said flattened end and accordingly side member of said handrail assembly.

7. A handrail assembly as claimed in claim 6, wherein said tube constituting said side member includes an additional tube mounted internally within said first tube to form a composite tube, said composite tube being flattened, the internal tube constituting strengthening means for the flattened end utilized for attachment of the frame work.

8. A handrail assembly as claimed in claim 7, wherein said framework includes at least two side members, each having a base end attachable to the platform, said side members including inner and outer concentrically positioned tubes in the region of the flattened end and imparting strength and rigidity to the flattened end area, the composite tube extending from the free end of the side member upwardly beyond the upper surface of said work platform and thereby providing strength in the areas of greatest strain with respect to said platform.

9. A handrail assembly as claimed in claim 8, wherein said framework includes at least two horizontally spaced side members, vertically positioned with respect to, and extending above said work platform, and horizontal tubular members interconnecting said side members to constitute said framework.

10. A handrail assembly adapted for mounting on a work platform to afford protection and convenience to persons while on said platform, said handrail assembly including a framework with at least one side member having a base end attachable to the platform, and the side member extending vertically upwardly therefrom, said platform including a substantially flat top and a depending peripheral skirt, said top having a slot therethrough, said side member being a tube having said base end thereof flattened, inserted in, and extended through said slot, means fixedly attaching said flattened extending end to the underside of said platform, said tube including an additional tube mounted within said base end to form a composite tube portion, the composite base end being flattened, the internal tube constituting strengthening means for the flattened end utilized for attachment of the frame work.

11. A handrail assembly as claimed in claim 10 wherein said framework includes at least two side members, each having a base end attachable to the platform, said side members including inner and outer concentrically positioned tubes in the region of the flattened end and imparting strength and rigidity to the flattened end area, the composite tube portion extending from the free end of the side member upwardly beyond the upper surface of the said work platform, and thereby providing strength in the areas of greatest strain with respect to said platform.

12. A handrail assembly as claimed in claim 11, wherein said framework includes at least two horizontally spaced side members, vertically positioned with respect to, and extending above said work platform, and horizontal tubular members interconnecting said side members to constitute said framework.

13. An earth working vehicle and the like including an operator's platform, at least one guard and protective rail assembly associated to said platform, means mounting said rail assembly, said mounting means being positioned and attached to said platform within the confines of the external perimeter thereof and therebelow, the attachment being hidden from view from above, and being disposed in a position preventing contact with objects external of the platform, or with the operator during movements to perform duties or functions on said platform.

14. An earth moving vehicle as claimed in claim 13, said operator's platform including a flat top and depending peripheral edge skirts conjointly defining a closed top and side, cap like member, and the attachment means being enclosed and contained within said cap like member.

15. An earth moving vehicle as claimed in claim 14, said earth moving vehicle comprising a wheeled front end loader, and including an operator's cab operatively mounted on said operator's platform.

16. An earth moving vehicle as claimed in claim 13, said earth moving vehicle comprising a wheeled front end loader, and including an operators cab operatively mounted on said operator's platform.

17. In combination, means defining a surface, a post attached to said surface means and extending therefrom, said post including a first tube and a strengthening second tube, said second tube being positioned interiorly of said first tube at an end thereof adapted for attachment to said surface means, said first and second tubes coacting to constitute a composite strengthened unitized tube end attachment portion, said composite tube end portion being flattened, said surface means having a slot therethrough, said flattened end being inserted through said slot from a first surface side to a second surface side, a block affixed on said second surface side of said surface means, said block having threaded bores therein, said flattened tube attachment end having holes therethrough, and threaded end attachment means extending through said holes and matedly engaging in said threaded bores and thereby securely attaching said post to said surface means at said second surface side.

18. The combination of claim 17, wherein said surface means includes a peripheral flange set at an angle to said surface side to form therewith an open sided cap shaped member, said block being attached to said second surface side, constituting the interior, under surface of said cap shaped member, and additionally, to said flange at an intersecting corner between said surface side and said flange, whereby the attachment of said tube is so wholly contained within the inner peripheral outline of the cap shaped member as to be hidden from view therebeyond, and absent any structural protrusions therefrom.

19. The combination of claim 18 wherein said block is welded to said second surface side and to said flange whereby the overall attachment and attached members conjointly have enhanced structural integrity.

20. The combination of claim 19, said block having longitudinally spaced threaded bores therein, said tube attachment end having correspondingly longitudinally spaced holes therethrough and of an elongated shape, whereby said post can be relatively adjustably positioned with respect to said block and said surface means, the multiple holes and bores being coactively engaged by said threaded end attachment means to prevent relative movement therebetween and said surface means and said post.

21. The combination of claim 20, said surface means comprising a working platform with said first surface side constituting an upper personnel supporting surface, said flange being a downwardly extending skirt, the attachment being below said upper personnel supporting surface and contained wholly within the periphery of said skirt.

22. The combination of claim 21, wherein a plurality of said posts are spacedly vertically mounted around portions of said working platform, horizontal members selectively interconnected between the vertical posts, said posts and said horizontal members comprising a safety guard rail on said working platform.

23. The combination of claim 22, said working platform being attached to a movably mounted construction vehicle.

24. In combination, means defining a surface and having a peripheral edge, a post attached to said surface means and extending therefrom, said post including a first tube and a strengthening second tube, said second tube being positioned interiorly of said first tube at an end thereof adapted for attachment to said surface means, said first and second tubes coacting to constitute a composite strengthened unitized tube end attachment portion, said composite tube end portion being flattened, said surface means having a slot therethrough, said slot being disposed inwardly from said peripheral edge, said flattened end being inserted through said slot from a first surface side to a second surface side, said flattened end being securely attached to said surface means at said second surface side inwardly of the said peripheral edge.

* * * * *